Figure 1:
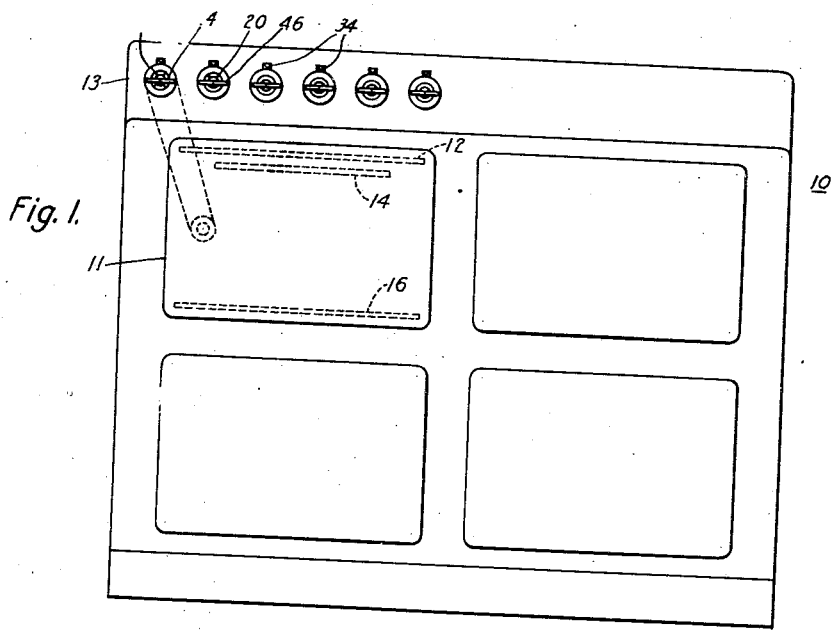

Oct. 14, 1941.                    E. H. LOCKWOOD ET AL                    2,259,315
                                  INVERTED THERMOSTAT DIAL
                                    Filed April 13, 1939

WITNESSES:

INVENTORS
Edwin H. Lockwood &
Earl K. Clark
BY
ATTORNEY

Patented Oct. 14, 1941

2,259,315

UNITED STATES PATENT OFFICE 2,259,315

INVERTED THERMOSTAT DIAL

Edwin H. Lockwood and Earl K. Clark, Mansfield, Ohio, assignors to Westinghouse Electric & Manufacturing Company, East Pittsburgh, Pa., a corporation of Pennsylvania Application April 13, 1939, Serial No. 267,579

1 Claim. (Cl. 219—20)

Our invention relates to ranges and more particularly to the control of range-oven heating systems.

Present safety requirements for range-oven heating systems require that all operating oven units be controlled by a protective thermostat responsive to the temperatures of the oven to prevent the oven from becoming overheated. Accordingly, when it is desired to use two separate oven switches (a "Bake" and a "Broil" switch), operating the oven heaters independently, it has heretofore been necessary to provide an independent control for this separate protective thermostat. The thermostat, when used with the broiling operation, is used primarily as a protective device, and when used with the baking operation adjustably varies the operating temperature of the oven. This procedure requires three control knobs; namely, two separate knobs for the two oven switches and a separate control knob for adjustably controlling the thermostat. Such thermostat should be set or adjusted to a high value when used with the broiling operation so as to permit the broiling heating elements to function at their maximum value while, at the same time, preventing the oven from becoming overheated. In contrast with this, the thermostat when associated with the baking elements, in addition to functioning as a protective device, selectively controls the heat output of such baking elements. In other words, an operator, when desiring to use the oven for broiling purposes, must first adjust the thermostat to its highest value before the broiling circuit can be properly operated. This requires two operations; namely, setting the thermostat and connecting the broiling circuit to a power supply. When desiring to use the oven for baking purposes, the operator must also set the thermostat to the desired value and connect the baking elements to the power supply. This procedure requires the operator to make at least two separate settings before operating the oven which is not convenient and not in keeping with our modern trend or modes.

It is, therefore, an object of our invention to provide a range-oven heating system having a single adjustable thermostat in which the "broil" switch, while not being connected to the adjustable thermostat, may properly and safely connect the oven heaters for the broiling operation with one setting only.

A further object of our invention is to provide a range-oven heating system having a separate adjustable thermostat mechanically associated with the baking control knob for adjustably varying the operation of the baking elements.

A further object of our invention is to provide an oven control system having separate "bake" and "broil" control and a single thermostat mechanically associated with the bake control only and electrically associated with both controls for protecting the broiling operation and selectively adjusting the baking operations of the oven.

Another object of our invention is to provide an oven control system having a single oven thermostat associated therewith for selectively controlling the heat output of both the baking and broiling operations.

A further object of our invention is to provide a range oven heating system having a two switch control therefor in which the "bake" switch thereof is initially turned from an "off" position to, first, its highest operating value and, then, selectively on to its lowest operating value, and from the lowest operating value to the "off" position through the highest operating value.

Another object of our invention is to provide an oven heating system control having a bake switch directly associated with the oven thermostat whereby as the "bake" switch is turned to its "off" position, the oven thermostat associated therewith is simultaneously adjusted to its highest operating position.

A still further object of our invention is to provide an efficient, rugged, inexpensive, easily operated range-oven control system, providing a single setting for the operator, in either a baking or a broiling operation.

Other objects of our invention will either be pointed out specifically in the course of the following description of a device embodying our invention, or will be apparent from such description.

Figure 2:
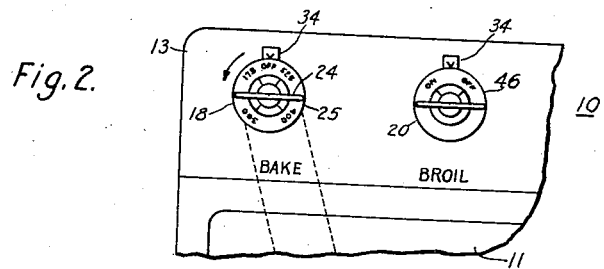
Figure 3:
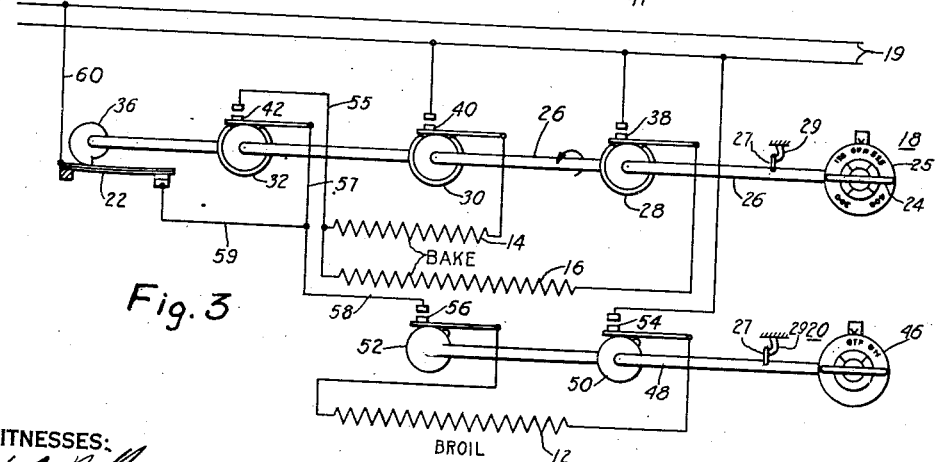

In the accompanying drawing:

Figure 1 is a front elevational view illustrating a range embodying our invention, Fig. 2 is an enlarged fragmentary view illustrating the range-oven control mechanisms, and Fig. 3 is a schematic wiring diagram illustrative of the switch mechanisms and controlling and limiting thermostat for the oven heating elements.

Referring to the accompanying drawing, we show a range 10 having an upper broiling heater 12, an upper baking heater 14 and a lower baking heater 16, a bake switch 18 and a broil switch 20 operatively associated with the respective heaters, and a shaft 26 for adjusting a thermostat 22 (Fig. 3) responsive to the temperatures of the range oven mechanically associated with the bake switch 18 and electrically associated with both the broiling heater 12 and baking heaters 14 and 16.

The range 10 may be of a usual construction including an oven 11 and backsplasher 13. The heating elements 12, 14 and 16 are positioned within the oven 11 and are controlled by a single oven thermostat 22, as hereinafter described. The operations of the heating elements 12, 14 and 16 are selectively adjusted by switches 18 and 20 substantially as hereinafter described. In addition, the oven bake switch 18, while controlling the operation of the baking heaters 14 and 16, selectively adjusts the operation of the thermostat 22. The switches 18 and 20 are, in this instance, attached to the range backsplasher 13. It is to be understood that the range structure need not be like that illustrated in Fig. 1, but may be of any desired construction or configuration, providing it includes an oven having a plurality of heating elements therein. In addition, the oven heating elements may be arranged within the oven in any desired manner.

The bake switch mechanism 18, mounted upon the backsplasher 13, comprises an operating handle 24 having, in this instance, an indicating dial 25 thereon, a horizontally disposed shaft 26, a plurality of cams 28, 30, 32 and 36 rigidly attached to the shaft 26 and a plurality of contactors 38, 40 and 42 operatively associated with the cams 28, 30 and 32, respectively. In addition, the contactors 38, 40 and 42 are associated with a power supply 19 and the heating elements 14 and 16. The handle 24 is rigidly attached to the front end of the shaft 26 and cooperates with an indicating marker 34 on the range backsplasher 13, in the usual manner, for indicating the relative positions of the switch 18. The cams 28, 30 and 32 operatively associated with contactors 38, 40 and 42 are adapted to close the contactors 38, 40, and 42 and to maintain them in such position in all positions of the operating handle 24 and shaft 26 other than the "off" position. Accordingly, when the switch 18 is in the "off" position, the contactors 38, 40 and 42 are disconnected. When the "bake" switch 18 is in a closed or operative position with the contactors 38, 40 and 42 closed or engaged, the baking elements 14 and 16 are thus connected to the power supply 19 through the thermostat 22 which is responsive to the temperatures of the heated oven, as hereinafter described.

The cam 36 positioned upon and rigidly attached to the shaft 26 cooperates with the thermostat 22 and is of such configuration that it adjusts the thermostat to its various operating values simultaneously with the operation of switch 18. The cam 36 is somewhat irregular in shape, being, in this instance, substantially in the form of an involute curve. The cam 36 is shown as being operatively associated with a strip thermostat (see Fig. 3). However, it is to be understood that the cam 36 and thermostat 22 are shown in their particular forms for illustrative purposes only. The thermostat 22 is preferably that disclosed in E. K. Clark application, Serial No. 236,226, filed Oct. 21, 1938, while the mechanical interconnection between the thermostat 22 and switch 18 is preferably that disclosed in E. K. Clark United States Letters Patent No. 2,178,066 issued October 31, 1939.

The cam 36 is, due to its particular shape and cooperation with switch 18, adapted to selectively adjust the thermostat 22 to various operating positions. With the switch 18 in an "off" position, the thermostat 22 is adjusted to its highest value. The contactors 38, 40 and 42 are simultaneously disengaged. Then as the handle 24 of switch 18 is turned in a counterclockwise direction, the contactors 38, 40 and 42 are engaged and the thermostat 22 is selectively adjusted from its highest to its lowest value to any predetermined position for maintaining a corresponding desired average oven operating temperature. The handle 24 may be turned in such a direction until the oven thermostat 22 is adjusted so as to maintain the lowest operating temperature, which is, in this instance, 175°.

As the handle is rotated to the lowest operating position, pin 27, rigidly attached to shaft 26, contacts the stop 29, which prevents any further rotation of the shaft 26. Accordingly, when it is desired to disconnect the oven circuit from the power supply 19, it is necessary to rotate the handle 24 in a clockwise direction to the "off" position. The cam 36 then resets the thermostat 22 to its highest value while the baking elements are simultaneously disconnected from the power supply by means of contactors 38, 40 and 42.

The current from supply circuit 19 which energizes the baking heater elements 14 and 16 through contactors 40 and 38, respectively, passes through the common return conductor 55, contactor 42, conductors 57 and 59, then through the thermostat 22, to conductor 60 and supply circuit 19. It is, therefore, obvious that the thermostat 22, responsive to the oven temperature, is adapted to control the passage of electric power through the baking heater elements 14 and 16.

The broil switch 20 comprises an operating handle 46, a horizontally disposed shaft 48, a plurality of cams 50 and 52 and contactors 54 and 56 operatively associated with the cams 50 and 52, respectively. When the broil switch 20 is in an "off" position, as illustrated in Fig. 3, the contacts 54 and 56 are both disengaged so as to entirely disconnect the broiling element from the power supply 19. The broil switch 20 is adapted, when rotated from the "off" to an "on" position, to connect the broil heating element 12 to the power supply 19 through the contactors 54 and 56 which become engaged through the cooperative action of the cams 50 and 52. The current passing through the broiling heater element 12 must traverse conductors 58 and 59, thermostat 22, and line 60 to the power supply. Accordingly, it is obvious that the thermostat 22 must be set to its highest value to permit satisfactory continued operation of the broiling element 12, and this desirable condition is instantly available without requiring any thought or special manipulation by an operator, since when "bake" switch 18 occupies its "off" position, thermostat 22 is in its high temperature position. However, should the broiling element 12 tend to overheat the oven, the thermostat 22, operatively associated therewith, will function in a protective capacity to disconnect the element 12 from the power supply.

The thermostat 22 thus acts as a thermal oven protective device for the broiling element 12, and, in addition, functions as an adjustable thermostat for selectively varying the operations of the baking elements 14 and 16.

It will be observed that, inasmuch as the single thermostat 22 is adapted to interrupt the passage of current to both the baking and broiling heater elements, such thermostat may be adjusted by the bake handle 24 to a preselected low operating position while the broiling element is connected to the power supply. The thermostat 22 would then intermittently disconnect all three heating elements from the power supply 19 so as to produce a selective low temperature broiling.

The baking elements 14 and 16 would, during such combined operation, be connected to the power supply 19 at the same time as the broiling element 12. The heat produced by the broiling element 12, in addition to that produced by the upper baking element 14, would broil meat placed within the oven, while the lower baking element 16 would add heat to the oven which, in turn, tends to slowly bake the meat.

This combined operation of the baking elements and broiling element thus provides a means whereby the broiling temperature may be selectively varied. By leaving the "bake" switch 18 in its "off" position, with the thermostat 22 simultaneously located at its highest operating position, the broiling element 12 will function in the usual manner. However, when the switch 18 has been rotated to a preselected temperature setting in conjunction with the broiling element, it follows that there will be a succession of broiling heats as well as a sustained baking action from the heat retained within the oven. This operation would thus combine a slow baking operation with a rapid broiling operation to afford a method of broiling meats to any desired "doneness" within a minimum time.

It, therefore, follows that by using a single adjustable oven thermostat in conjunction with the making control switch, such thermostat may be used in conjunction with the broiling and baking heaters to produce any desired low-temperature broiling value.

In addition, by having the thermostat connected in a "reverse" manner to the bake switch, that is, with the thermostat adjusted to its highest value when the switch is turned off, the broiling circuit can be properly as well as safely connected to the supply circuit without the need of an operator first adjusting the thermostat to its highest value.

Various modifications may be made in the device embodying our invention without departing from the spirit and scope thereof, and we desire, therefore, that only such limitations shall be placed thereon as are imposed by the prior art and the appended claim.

We claim as our invention:

An oven control system comprising, in combination, first contact means, second contact means, bake heater means controlled by said first contact means, broil heater means controlled by said second contact means, and a single thermostat electrically associated with both said contact means and mechanically movable only when the first thereof is moved, said thermostat automatically occupying its highest setting upon said first contact means being moved to deenergize said bake heater means, and means for moving said second contact means to energize said broil heater means when said bake heater means is so deenergized, to thereby inherently provide protection for said broil heater means operating at the maximum heating capacity thereof without requiring any adjustment of said thermostat.

EDWIN H. LOCKWOOD.
EARL K. CLARK.